US009860155B1

(12) United States Patent
Segel et al.

(10) Patent No.: US 9,860,155 B1
(45) Date of Patent: Jan. 2, 2018

(54) CODE COVERAGE AND DATA ANALYSIS

(71) Applicant: Amazon Technologies, Inc., Reno, NV (US)

(72) Inventors: Phillip Scott Segel, Auburn, WA (US); Michael Leo Weiss, Maple Valley, WA (US); Aravindhan Vijayaraghavan, Chennai (IN); Praveen Kumar Udayakumar, Chennai (IN)

(73) Assignee: Amazon Technologies, Inc., Reno, NV (US)

( * ) Notice: Subject to any disclaimer, the term of this patent is extended or adjusted under 35 U.S.C. 154(b) by 531 days.

(21) Appl. No.: 14/040,188

(22) Filed: Sep. 27, 2013

(51) Int. Cl.
*G06F 15/16* (2006.01)
*H04L 12/26* (2006.01)
*G06F 12/00* (2006.01)

(52) U.S. Cl.
CPC .................... *H04L 43/50* (2013.01)

(58) Field of Classification Search
CPC ............... H04L 43/50; G01R 1/06772; G01R 1/06788; G01R 31/2851; G01R 31/3177; G01R 31/318511; G01R 31/318533; G01R 31/318536; G01R 31/318541; G01R 31/318544; G01R 31/318555; G01R 31/3187
See application file for complete search history.

(56) References Cited

U.S. PATENT DOCUMENTS

| | | | |
|---|---|---|---|
| 6,973,415 B1 * | 12/2005 | Saghier | G06Q 10/06 702/186 |
| 2007/0179892 A1 * | 8/2007 | Chan | G06Q 90/00 705/51 |
| 2009/0158266 A1 * | 6/2009 | Celli | G06F 8/60 717/168 |
| 2013/0305030 A1 * | 11/2013 | Chen | G06F 9/44505 713/100 |
| 2015/0106813 A1 * | 4/2015 | Mihalocivi | G06F 9/45558 718/1 |
| 2015/0120791 A1 * | 4/2015 | Gummaraju | G06F 17/30194 707/823 |

(Continued)

OTHER PUBLICATIONS

[https://web.archive.org/web/20150610211928/http://www.bullseye.com/coverage.html Author: Steve Cornett Title: Code Coverage Analysis.*

(Continued)

*Primary Examiner* — Zarni Maung
(74) *Attorney, Agent, or Firm* — Lowenstein Sandler LLP

(57) ABSTRACT

Techniques described herein provide for real-time observation of utilization of one or more resources by a system in response to an input. The real-time observation by a system may occur in an environment in which end users supply inputs to the system (e.g., a production environment). In various embodiments, a server system may provide a service to a client system. A client system may take advantage of this service by sending an input to the server system. In response, the server system may perform the provisioned service using the input from the client system. In connection with the service, the utilization of resources (e.g., by a process) and/or the client system-supplied input may be recorded, such as when resources are utilized in an unexpected or interesting manner. These records may be used at a later time for testing and analysis.

19 Claims, 6 Drawing Sheets

(56) References Cited

U.S. PATENT DOCUMENTS

2015/0186236 A1* 7/2015 Chandrasekharapuram .............. G06F 11/263
714/33
2015/0269496 A1* 9/2015 Arguelles ............. G06N 99/005
706/12

OTHER PUBLICATIONS

[https://web.archive.org/web/20150610211928/http://www.bullseye.com/coverage.html Author: Steve Cornett Title: Code. Coverage Analysis.*

* cited by examiner

CODE COVERAGE AND DATA ANALYSIS

BACKGROUND

Comprehensive testing of a computing system is paramount to its success in a production environment. Existing tools, such as profilers, may only statically test a system by running a fixed set of tests through the system and generating an output to display to a user. For example, existing tools may only output a display of the lines of code that were executed during the fixed set of tests. With these existing tools, developers frequently must create contrived examples and/or mock code for the fixed set of tests to cause particular code paths to execute. Consequently, the fixed set of tests may not accurately mirror production scenarios. Particularly, execution of the fixed set of tests may not provide information reflective of what inputs and/or parameters cause specific code paths to be reached.

Further, a developer may require accurate measurements reflecting the consumption of resources that result from the processing of data by the system. For example, different inputs and/or code configurations may result in more or less efficient memory usage by the system. A fixed set of tests in a testing environment may not be reflective of actual resource consumption by the system in a production environment. Therefore, a developer may find it difficult to discern from a testing environment which specific actions, such as transactions or inputs, may cause software to behave undesirably in production environments.

BRIEF DESCRIPTION OF THE DRAWINGS

The embodiments described herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION

Techniques described herein provide for real-time observation of utilization of one or more resources by a system in response to an input. The real-time observation by a system may occur in an environment in which end users supply inputs to the system—that is, a production environment that presents the system to end users as operable for its intended purpose. Thus, the embodiments described herein may relate to a server system communicatively coupled with one or more client systems which may provide inputs to the server system. Diverse inputs provided by client systems may require disparate levels of resource consumption, and information related to such resource consumption may be leveraged to improve systems for end users in production environments.

In various embodiments, a server system may provide a service to a client system. For example, a server system may offer services for electronic commerce ("e-commerce"), digital content publication, application compilation and deployment, and/or other digital services that may be provided over a network. A client system may take advantage of this service by sending an input to the server system. The input may be consistent with the embodiment of the service provided by the server system—e.g., a client system may submit text to a digital publication service so that the text may be compiled as an electronic book ("eBook"). In response, the server system may perform the provisioned service using the input from the client system. As an inherent consequence of performing the service, resources of the server system may be consumed. This real-time resource consumption may be observed, and if resources are consumed in an unexpected or interesting manner then the server system may record indications of this consumption.

Recorded information related to resource consumption may later be used for regression testing and/or other analysis. For example, a record of utilization of software resources (e.g., a record of instructions corresponding to source code) may indicate code coverage for testing source code of a service provided by the server system. In another example, a record of time taken for the server system to perform a service in response to a plurality of inputs may indicate that service is unexpectedly slow. In various embodiments, a plurality of records may be used to predict trends of inputs and/or forecast hardware capacity. In effect, the real-time usage of a server system in a production environment may be exploited as a testing method.

Figure 1:
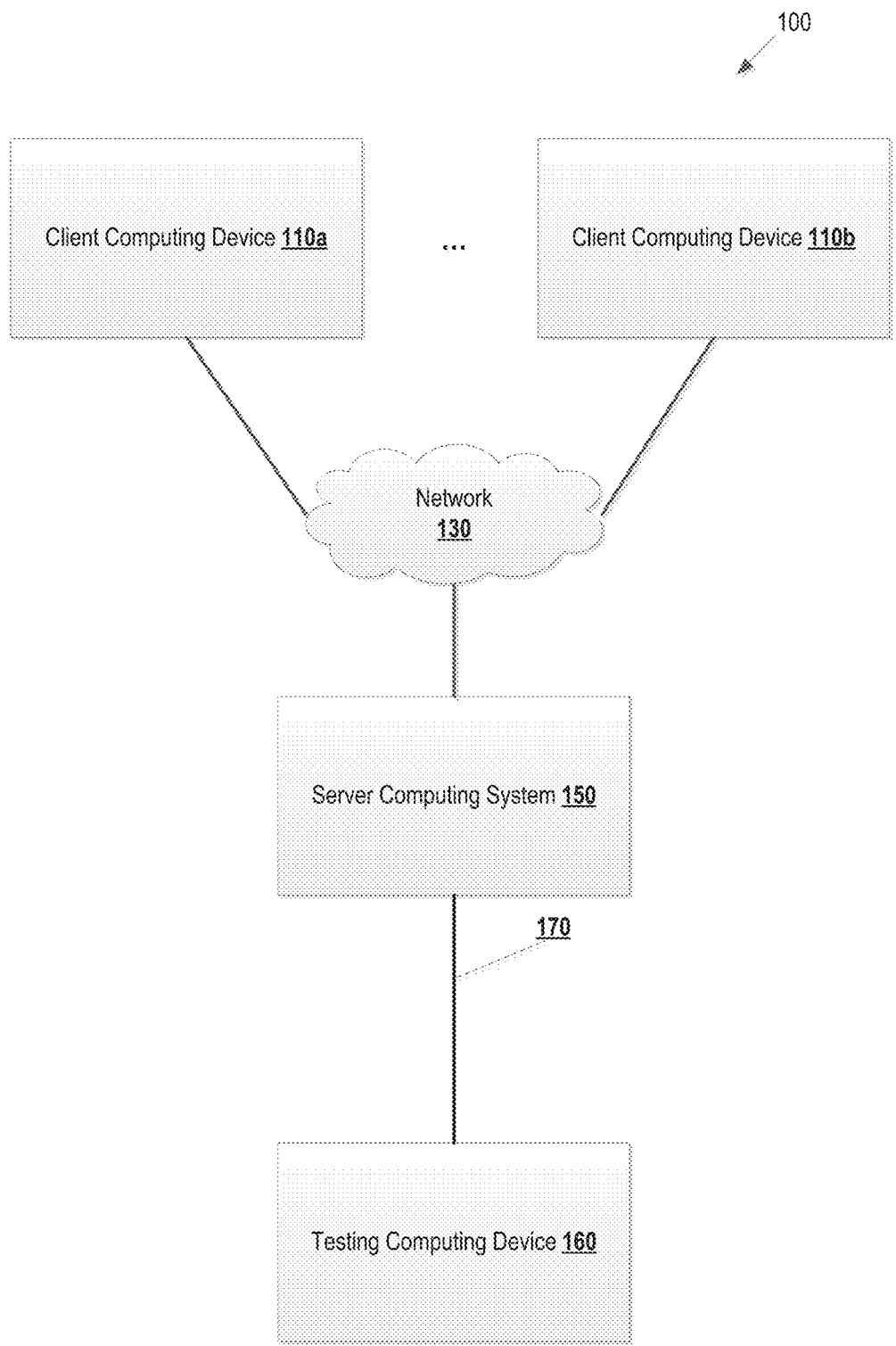
FIG. 1 is a block diagram depicting a system for gathering usage of computing resources for testing processes of a production environment, according to various embodiments.

FIG. 1 illustrates an exemplary embodiment of a system 100 for observing real-time utilization of one or more computing resources. The system 100 includes, but is not limited to, a server computing system 150 (herein, "server 150"), a plurality of client computing devices 110a-b (herein, "clients 110a-b"), a testing computing device 160, and a network 130. A client 110 may be any type of client, such as a personal computer (e.g., a desktop computer, laptop computer, server, a tablet computer), a workstation, a handheld device, a web-enabled appliance, a gaming device, a mobile phone (e.g., a Smartphone), an eBook reader, or any computing device operable to communicate over the network 130. Accordingly, the clients 110a-b are configured for intersystem communication across a network 130. The network 130 may be a public, private, wired, wireless, hybrid network, or a combination of different types of networks. The network 130 may be implemented as a local area network ("LAN"), a wide area network ("WAN") such as the Internet, a corporate intranet, a metropolitan area network ("MAN"), a storage area network ("SAN"), a Fibre Channel ("FC") network, a wireless cellular network (e.g., a cellular data network), or a combination thereof.

The network 130 may communicatively couple a client 110 with a server 150. The server 150 may include any arrangement of hardware and software embodied in a computing device configured to provide access to one or more services to a client 110 over the network 130. In various embodiments, the server 150 may include a server operating system, one or more software applications and hardware (e.g., dedicated hardware) adapted to receive requests from a client 110 over the network 130 and respond as configured. In some embodiments, the server 150 may include a plurality of physical devices (e.g., hardware distributed in multiple physical machines). Thus, the server 150 may include two or more coupled computing devices that cooperatively operate and may be visible across the network 130 as a single system.

The arrangement of the server 150 and the clients 110a-b in the system 100 may be a production environment—that is, services provided by the server 150 to the clients 110a-b may be provided in real-time. For example, end users (e.g., third-party customers) may use the clients 110a-b to receive services from the server 150 for real-world operations. A client 110 may transmit an input over the network 130 to the server 150. In response, the server 150 may execute a service using the input and may provide the client 110 with an appropriate real-time response. In performing these operations, the server 150 may observe computing resources that are consumed as a consequence. If the server 150 observes any interesting or unexpected resource consumption, the server 150 may log information related to the operations that resulted in the interesting or unexpected resource consumption (e.g., the server 150 may record the input and the interesting or unexpected resource consumption).

In some embodiments, the server 150 may be communicatively coupled with a testing computing device 160. The testing computing device 160 may be connected with the server 150 through an interconnect 170, which may be a bus or a network (e.g., a network similar to the network 130). In the system 100, the testing computing device 160 may be implemented locally (e.g., integrated with the server 150) or remotely (e.g., external from the server 150). The testing computing device 160 may be configured to test functional and nonfunctional requirements of a service provided by the server 150 to a client 110. Accordingly, the testing computing device 160 may include software and hardware adapted to execute such a service.

The testing computing device 160 may be configured to perform regression testing, code coverage analysis and other data analysis of a service provided by the server 150. Therefore, the arrangement of the server 150 and the testing computing device 160 may be a testing environment. In executing a service, the testing computing device 160 may operate to test that service so that a corresponding service at the server 150 may be improved. However, the testing computing device 160 may not be part of the production environment, because the testing computing device 160 may not provide a service that is delivered to a client 110. For example, the testing computing device 160 may be configured to execute a service that is similar to that provided by the server 150, and the testing computing device 160 may perform such an similar service operation using an input similar to that provided to the server 150 by a client 110. The server 150 may provide these inputs to the testing computing device 160 from the inputs that were recorded in the production environment for interesting or unexpected resource consumption.

In various embodiments, the testing computing device 160 may be configured to predict trends based on a plurality of inputs received from the clients 110a-b (e.g., predict when the server 150 will receive a large volume of inputs from a specific client 110a). In another embodiment, the testing computing device 160 may evaluate the hardware capabilities of the server 150 in relation to inputs from the clients 110a-b (e.g., a specific input from a client 110 may be memory intensive and, therefore, the testing computing device 160 may determine that the available memory of the server 150 is insufficient to continually process similar requests).

Figure 2:
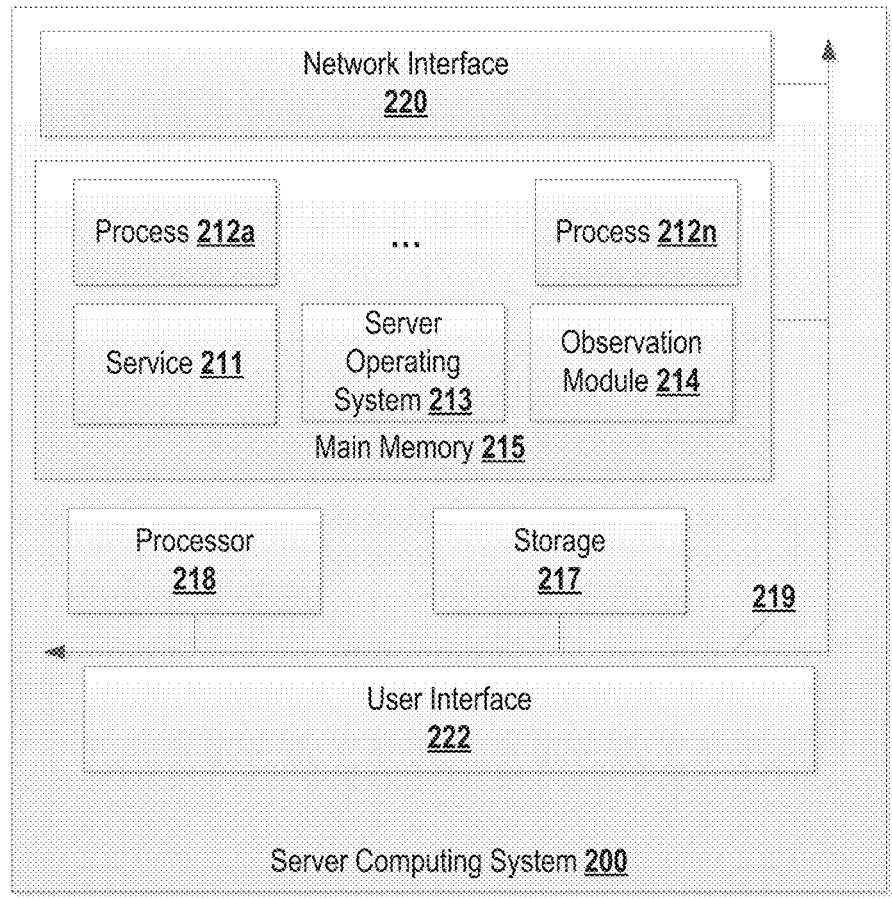
FIG. 2 is a block diagram depicting a server computing system, according to various embodiments.

Turning now to FIG. 2, an embodiment of a server computing system 200 is shown. The server computing system 200 may be included in the server 150 of FIG. 1. The server computing system 200 includes, but is not limited to: main memory 215, storage 217, processor 218, network interface 220, and/or user interface 222. These components may be communicatively coupled through a bus 219. The bus 219 may be any subsystem adapted to transfer data within the server computing system 200. The bus 219 may include a plurality of computer buses as well as additional circuitry adapted to transfer data.

To communicate data with a client computing device and/or testing computing device (not shown), the server computing system 200 includes a network interface 220. The network interface 220 may accept data across a network (not shown) from a computing device to be processed by the server computing system 200. Correspondingly, the network interface 220 may transmit data across a network, such as a response to a received request. The network interface 220 may be implemented in hardware, software or a combination of the two and may include, for example, components such as a network card, network access controller or a host bus adapter. The network interface 220 is communicatively coupled with the processor 218, which executes instructions for the server computing system 200. In one embodiment, some or all of the instructions for the network interface 220 are executed by the processor 218.

As an additional means of receiving data, the server computing system 200 may include a user interface 222 to receive input from a user. The user interface 222 may allow a user to interact with the server computing system 200 through various means, according to different embodiments—e.g., the user interface 222 may be presented to a user on a display (not shown) as a graphical user interface or through a command line interface. To receive user input, the user interface 222 may be implemented in hardware, software or a combination of the two and may include or may be communicatively coupled with one or more hardware devices suitable for user input (e.g., a keyboard, a mouse or touch screen). Further, some or all of the instructions for the user interface 222 may be executed by the processor 218.

The processor 218 may be any processor suitable to execute instructions of the components 211-214 illustrated in the main memory 215. Accordingly, the processor 218 may be, for example, a central processing unit ("CPU"), a microprocessor, or other similar processor. In some embodiments, the processor 218 includes a plurality of processors, such as a dedicated processor (e.g., a graphics processing unit), a network processor or any processor suitable to execute operations of the server computing system 200.

Coupled to the processor 218 is the main memory 215. The main memory 215 may offer both short-term and long-term storage and may in fact be divided into several units (including a unit located at the processor 218). The main memory 215 may be volatile, such as static random access memory ("SRAM") and/or dynamic random access memory ("DRAM") and may provide storage (at least temporarily) of computer readable instructions, data structures, software applications, and other data for the server computing system 200. Such data may be loaded from the storage 217. The main memory 215 may also include cache memory, such as a cache located at the processor 218. The main memory 215 may include, but is not limited to, a number of components 211-214 that are configured to be executed by the processor 218: a service 211, a plurality of processes 212a-n, a server operating system 213, and an observation module 214.

In various embodiments, the server operating system 213 is configured to initiate the execution of the instructions, such as instructions provided by the service 211 or the observation module 214. In particular, the server operating system 213 may be adapted to serve as a platform for running the service 211 for multiple client computing devices across a network. The server operating system 213 may be adapted to perform other operations across the components of the server computing system 200 including threading, resource management, data storage control and other similar functionality.

The server operating system 213 may cause the processor 218 to execute instructions for a service 211. The service 211 may include code representing instructions configured to provide functionality to a client computing device, such as in response to an input from the client computing device. The service 211 may be, for example, a software application, framework or library. In various embodiments, the service 211 may provide data storage, manipulation, communication, or other similar functionality, which may be accessible to a client computing device over a network. For example, the service 211 may be a digital publication service, an electronic marketplace having e-commerce functionality, virtualization services, or essentially any functionality that is suitable to be accessed at the server computing system 200 by a client computing device over a network.

The service 211 may cause one or more processes 212a-n to be executed at the server computing system 200. A process 212 may be an instance that is to be executed at the server computing system 200 and, therefore, may include code as well as the current activity of that process 212. In some embodiments, the service 211 may have a one-to-one relationship with a process 212 that is executed at the server computing system 200. In other embodiments, the service 211 causes a plurality of processes 212a-n to be invoked. A plurality of processes 212a-n may be executed by the processor 218 for the service 211 where, for example, an input received from a client computing device requires multiple instances of a plurality of applications (not shown) to suitably respond to the input. In another example, a plurality of processes 212a-n may be instantiated for a plurality of inputs that are contemporaneously received from a plurality of client computing devices.

The execution of one or more processes 212a-n at the server computing system 200 may cause one or more computing resources of the server computing system 200 to be consumed. For example, a process 212 that is executed by the processor 218 may cause the consumption of at least one of machine-executed instructions, processor capacity, memory availability, network communication, disk access, and execution duration associated with the performance of the process. Generally, a plurality of resources may be consumed by the execution of a process 212. The observation module 214 may be configured to observe consumption of one or more resources and record the observed resource consumption. In one embodiment, the observation module 214 may be adapted to record interesting or unexpected resource consumption and associate that resource consumption with an input that caused a process 212 to be executed. For example, the observation module 214 may create a record when the consumption of a specific resource exceeds a predetermined threshold. In another embodiment, the observation module 214 may create a record when an instruction corresponding to a specific line of code comprising the service 211 is executed.

The observation module may persistently store records at a storage 217, such as in a log file. The storage 217 may include non-volatile memory, such as read-only memory ("ROM") and/or mass storage. The storage 217 may be implemented as, for example, conventional magnetic disks, optical disks such as CD-ROM or DVD based storage, magnetic tape storage, magneto-optical ("MO") storage media, solid state disks, flash memory based devices, or any other type of storage devices suitable for storing data. In some embodiments, the storage 217 includes registers, caches or other similar temporary memory components. Though illustrated as a single device, storage 217 may be a combination of several devices.

It should be appreciated that embodiments as will be hereinafter described may be implemented in conjunction with the execution of instructions by the processor 218 and/or other circuitry of the server computing system 200. In particular, logic of the server computing system 200, including but not limited to the processor 218, may operate under the control of a program, routine or the execution of instructions to execute methods or processes in accordance with embodiments described herein. For example, the observation module 214 may be implemented in firmware, software (e.g., stored in main memory) or hardware (e.g., an application-specific integrated circuit) and may be implemented by the processor 218 and/or other logic of the server computing system 200. Further, it should be appreciated that the terms processor, microprocessor, circuitry, controller, etc., refer to any type of logic or circuitry capable of executing logic, commands, instructions, software, firmware, functionality and the like.

Figure 3:
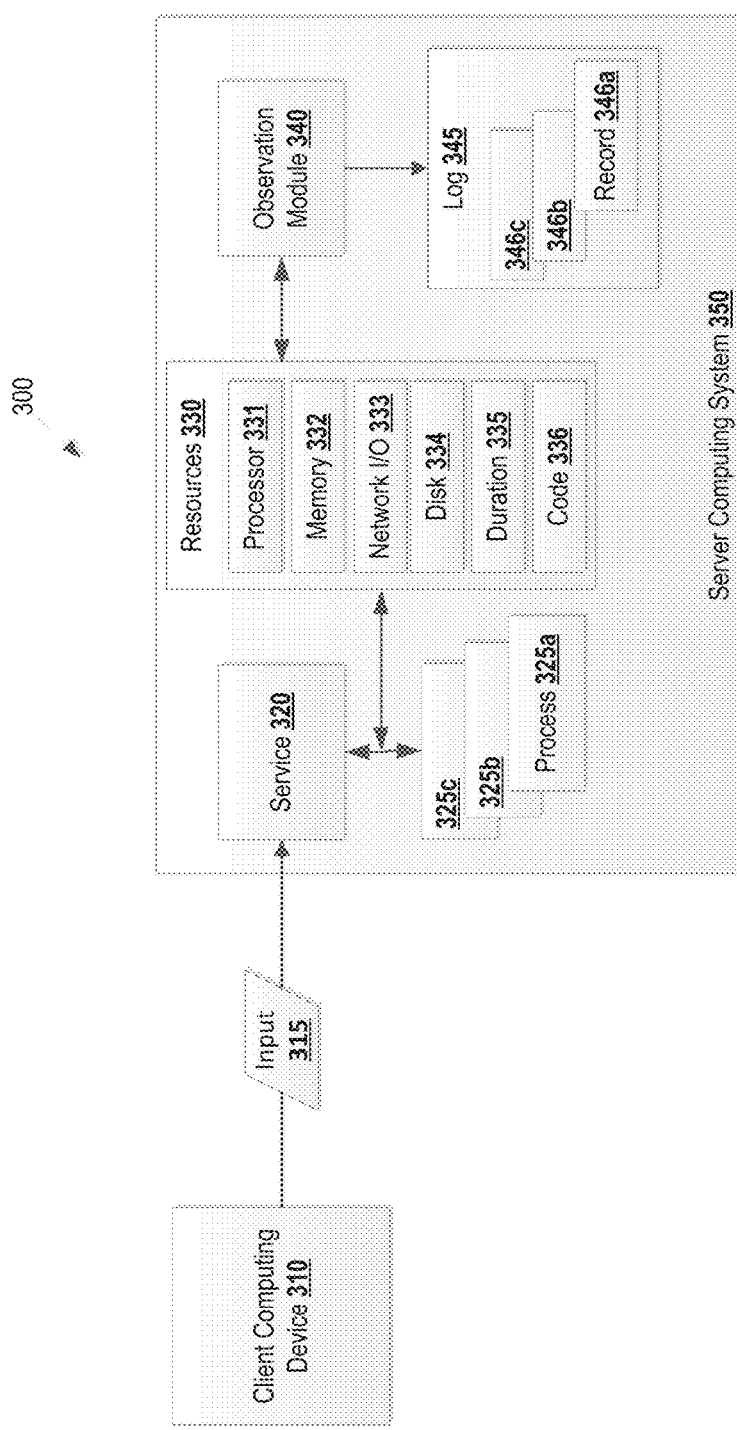
FIG. 3 is a conceptual block diagram depicting a production environment for gathering usage of computing resources for testing processes, according to various embodiments.

FIG. 3 illustrates a conceptual block diagram of a production environment 300 for the real-time utilization of one or more computing resources. The client computing device 310 (herein, "client 310") may be included in any of clients 110a-b of FIG. 1. Similarly, the server computing system 350 (herein, "server 350") may be included in the server 150. Accordingly, the client 310 may be communicatively coupled with the server 350 over a network (not shown).

In the production environment 300, the server 350 may be adapted to provide access to a service 320 to the client 310. In various embodiments, the service 320 may be a network service and/or network-based service or other hosted service (e.g., cloud computing service). For example, the service 320 may be software as a service, platform as a service or other similar functionality that is centrally hosted. The client 310 is configured to provide an input to the server 350, which may be a request for the service 320. Because the input 315 may be intended by the client 310 for the service 320, the embodiment of the input 315 may vary according to the service 320 that is provided by the server 350. Thus, the input 315 may be, for example, an e-commerce transaction, content that is to be digitally published, a software application that is to be deployed on a platform as a service or any other input that may be transmitted from the client 310 to the server 350 over a network.

In response to receiving the input 315 for the service 320, one or more processes 325a-c may be executed at the server 350. A process 325 may be instantiated as a result of the invocation of the service 320 in response to the input 315. Alternatively, a process 325 that is required to perform the service 320 may be already running when the service 320 is invoked. For example, a process 325 may be perpetually running at the server 350 or may be instantiated as an indirect consequence of the service 320, such as a process related to network communication.

As an effect of the execution of the one or more processes 325a-c, one or more resources 330 are utilized at the server 350. A resource 300 may be physical or virtual, tangible or intangible, and essentially may be any element utilized in the execution of the one or more processes 325a-c. In one embodiment, a resource 330 includes the processor 331 that is available at the server 350. The execution of one or more processes 325a-c causes a percentage of the capacity of the processor 331 to be consumed. In another embodiment, a resource 330 includes the memory 332. Generally, the server 350 has a finite amount of space to temporarily stored instructions and related data, therefore the execution of each of processes 325a-c causes the usage of the memory 332 to increase up to a critical level at which no further executions may be executed. In a third embodiment, a resource 330 includes one or more network input/output ("I/O") transactions 333. The network I/O transaction(s) 333 includes data that is transmitted outside of the server 350 over a network (not shown); for example, data that is communicated to the client 310 in response to the performance of the service 320 for a given input 315. In a fourth embodiment, a resource 330 includes a disk 334. Various embodiments of the service 320 may result in data being stored at or read from a disk, such as a local mass storage device of the server 350. In a fifth embodiment, a resource 330 includes a duration 335. The duration 335 may be an amount of time that it takes for a process 325 (e.g., at least a part of the service 320) to be executed. In another embodiment, a resource 330 includes code 336 comprising the service 320. The code 336 may be compiled to machine-executable instructions and, therefore, as the service 320 (e.g., processes 325a-c) is executed the machine-executable instructions will correspond with a section of code for the service 320. Consequently, as the machine-executable instructions are executed, a corresponding section of code will be reached until the service 320 is completely executed.

In various embodiments, the server 350 includes an observation module 340. The observation module 340 is configured to observe, in real-time, a resource 330 that is utilized as a consequence of the service 320. For example, the code comprising the service 320 may be instrumented and, accordingly, the observation module 340 may be configured to observe the utilization of one or more resources 330 at predetermined points during the execution of the service 320. The observation module 340 may subsequently store the observed utilization of resources as records 346a-c in a log 345.

A record 346 may include an indication of the input 315 (e.g., data included in the input) that caused a resource to be consumed as well as a resource 330 that was consumed. For example, a record 346a may include an indication of an input 315 that caused instructions corresponding to a section of code 336 to be executed as well as the section of code 336 that was executed, while another record 346b may include that same input 315 as well as a utilization of memory 332. In various embodiments, the observation module 340 is adapted to create a record 346 in response to an interesting or unexpected utilization of a resource 330. For example, the observation module 340 may be configured to create a record 346 where the observed utilization of a resource 330 exceeds a predetermined threshold. In another example, the observation module 340 may be configured to create a record 346 where an observed resource 330 is utilized unexpectedly, such as where an unexpected section of code 336 is executed as a result of the input 315.

Records 346a-c may be separated into groups based on the type of resource 330 that is recorded in record. For example, a first log file 345 may contain a first set of records 346a-c related to the processor 331 while a second log file that is similar to the first log file 345 may contain records (similar to the first set of records 346a-c) related to the memory 332. In various embodiments, particularly expensive resource consumptions may be identified and suites of tests geared toward those resources may be developed.

In some embodiments, records 346a-c may be separated into groups that are each representative of type of client 310 that provides an input 315. This grouping structure may be representative of the type of traffic (e.g., a plurality of requests 315) from a plurality of clients 310 in the production environment. For example, in an embodiment in which an input 315 is an eBook, an indication of each input 315 of whether the eBook is a plain-text document or a rich-text document. Accordingly, a number of plain-text documents (e.g., separated into a first group) may be compared to a number of rich-text documents (e.g., separated into a second group).

In some embodiments, the server 350 is configured to communicate the log 345 outside of the production environment 300. The records 346a-c of the log 345 may subsequently be used to recreate the utilization of one or more resources 330 resulting from the execution of the service 320 using the input 315. In one embodiment, the server 350 is adapted to transmit the log 345 over a network to a testing computing device (not shown). In another embodiment, the server 350 includes a testing computing device so that testing and analysis using the records 346a-c of the log 345 may be performed at the server 350 using components outside of the production environment 300 (not shown). With the records 346a-c, a testing computing device may identify specific inputs that affect a server computing system greater than other inputs. Additionally, the records 346a-c may be used to create a baseline from a plurality of inputs. In various embodiments, a testing computing device may group records 346a-c of a same type of input or record so that properties related to that input or record may be analyzed.

Figure 4:
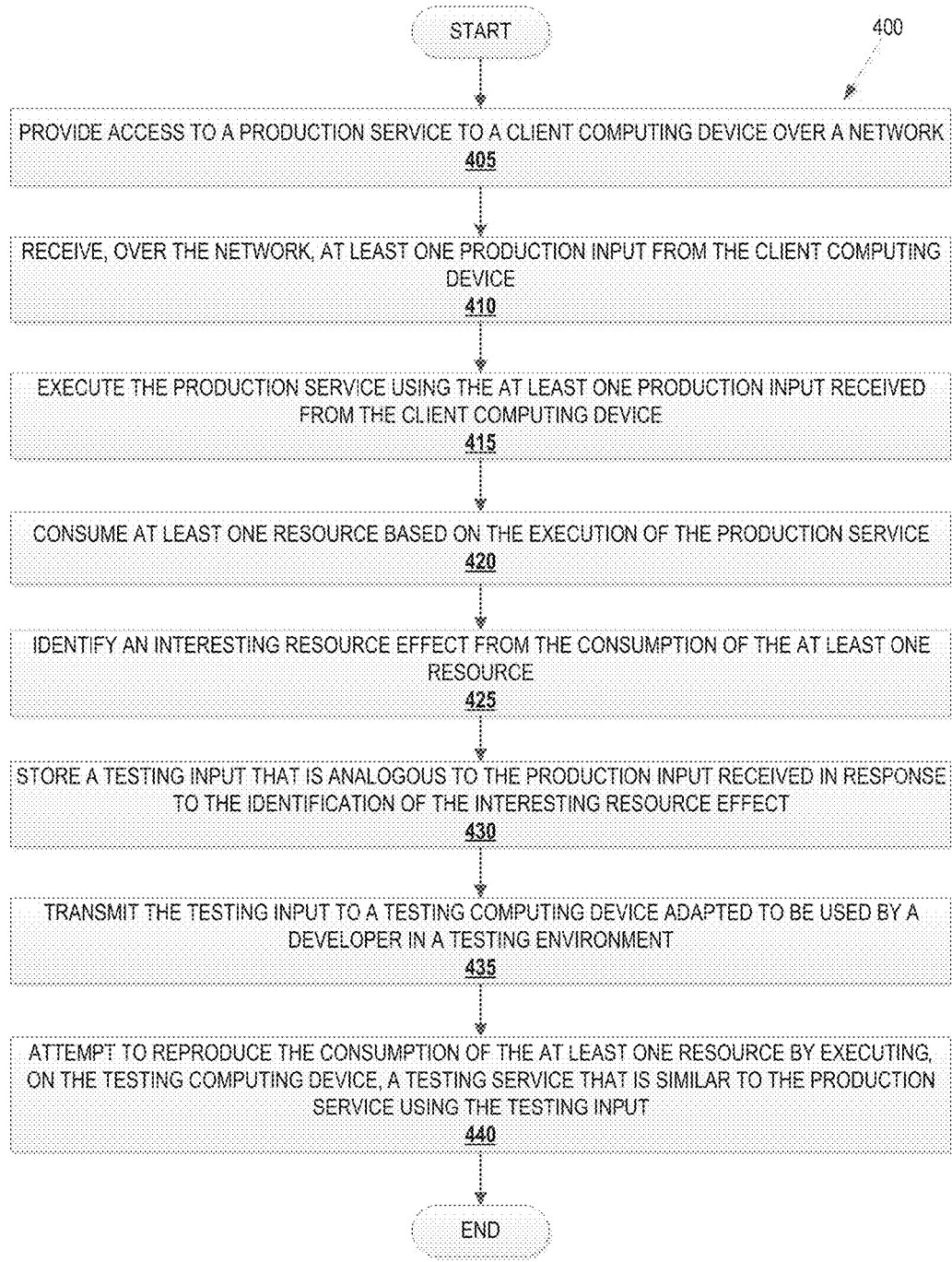
FIG. 4 is a flow diagram depicting a method for testing for an interesting effect on a computing resource in a production environment, according to various embodiments.

With respect to FIG. 4, this figure illustrates a method 400 for testing for an interesting effect on a computing resource in a production environment. The method 400 may be performed in the system 100 by, for example, the server 150 and the testing computing device 160. While FIG. 4 illustrates a plurality of sequential operations, one of ordinary skill would understand that one or more operations of the method 400 may be transposed and/or performed contemporaneously.

The method 400 begins with an operation 405 of providing access to a service to a client computing device. Access to this service may be provided over a network, such as the Internet, an intranet, a local area network, a wireless cellular network, or other network. In various embodiments, this service is presented to the client computing device as a "live" service that is operable to provide the client computing device with real-time functionality in an expected manner—that is, the service is a production service that is deployed in a production environment.

A production service may be, for example, a software application, framework or library. In various embodiments, a production service may provide data storage, manipulation, communication, or other similar functionality, which may be accessible to a client computing device over a network. For example, the production service may be a digital publication service, an electronic marketplace having e-commerce functionality, virtualization services, or essentially any functionality that is suitable to be provided over a network by the server computing system.

A client computing device may interface with the production service and, therefore, operation 410 includes receiving a production input from the client computing device. This production input may be received from the client computing device over a network. The embodiment of the production input may vary according to the production service provided the client computing device. In various embodiments, the production input may be, for example, code that is to be compiled by the production service, content that is to be digitally published (e.g., an eBook), and/or data that is to be stored or manipulated by the production service. In connection with the reception of the production input from the client computing device, operation 415 includes executing the production service using the production input. In various embodiments, the execution of the production service involves the execution of one or more processes.

In connection with executing the service, the operation 400 includes the operation 420 of utilizing at least one resource. While at least one resource is consumed based on the execution of the production service, a resource may be consumed as an indirect result of the production service. For example, the production service may require a first process to be executed that consequently requires a second process to be executed. The execution of the second process may still consume resources based on the production service, even though the second process may not be instantiated by the execution of the production service. In various embodiments, the resource may not be a physical resource with a finite availability (e.g., processor capacity, memory usage, etc.). Rather, the resource may be intangible but quantifiable, such as a duration related to execution of the production service (e.g., the duration of invocation to completion). Alternatively, the resource may be the code comprising the production service that is traversed by the execution of the instructions corresponding to the code.

The consumption of the one or more resources based on the execution of the production service may be observed at various intervals, such as before, during and after execution (although the resource consumption may also be perpetually observed). From the observation, an operation 425 includes identifying an interesting effect on a resource from the consumption of at least one resource. The interesting resource effect may be an observed resource consumption that, for example, reaches a predetermined threshold or is otherwise remarkable. The interesting resource effect may vary according to the embodiment and may include expensive utilizations of one or more resources, such as a large percentage of processor capacity or memory usage.

In one embodiment, the execution of the production service may cause a percentage of a processor capacity at the server computing system to be consumed. Therefore, an interesting resource effect may be an identified consumption of processor capacity (e.g., a percentage of processor capacity). In another embodiment, an interesting resource effect may be an identified consumption of memory capacity. That is, the execution of the production service may cause memory to be consumed at the server computing device; an interesting resource effect may be a critical level at which no further executions may be executed by the memory. In various embodiments, an interesting resource effect may also include network I/O transactions, disk I/O transactions, and/or a duration for the production service to be executed. In another embodiment, the interesting resource effect may be a section of code corresponding to instructions executed for the production service—e.g., code comprising the production service may include a marker associated with an untested section of that code, and an execution of the production service that reaches that marker may trigger the identification of the interesting resource effect.

In response to identifying the interesting resource effect, the method 400 includes an operation 430 for storing an indication of a testing input that is similar to the production input. The testing input may be identical to the production input received over the network from the client computing device, or may be a modified version of the received production input. In various embodiments, the testing input may be recorded in, for example, a log file and may be stored in connection with the identified interesting resource effect which caused the testing input to be stored.

The testing input may not serve any purpose in the production environment, as it is unlikely to be used for providing the production service to a client computing device. Therefore, the operation 435 comprises transmitting the indication of the testing input to a testing computing device that is adapted to be used by a developer in a testing environment. At a testing computing device, operation 440 may be performed by attempting to reproduce the consumption of the at least one resource. The testing computing device may have stored therein a testing service that is similar to the production service—that is, the testing service may be configured to provide functionality that is similar to the production service, but may feature changes to the underlying code (e.g., code optimizations, bug fixes, etc.). The testing service may be used to perform, for example, regression testing and/or code coverage analysis. Accordingly, a developer in the testing environment may address unexpected results, such as by modifying code to improve resource consumption and/or address errors. The modifications to the underlying code may be implemented in newer iterations of the production service that is deployed in the production environment.

Figure 5:
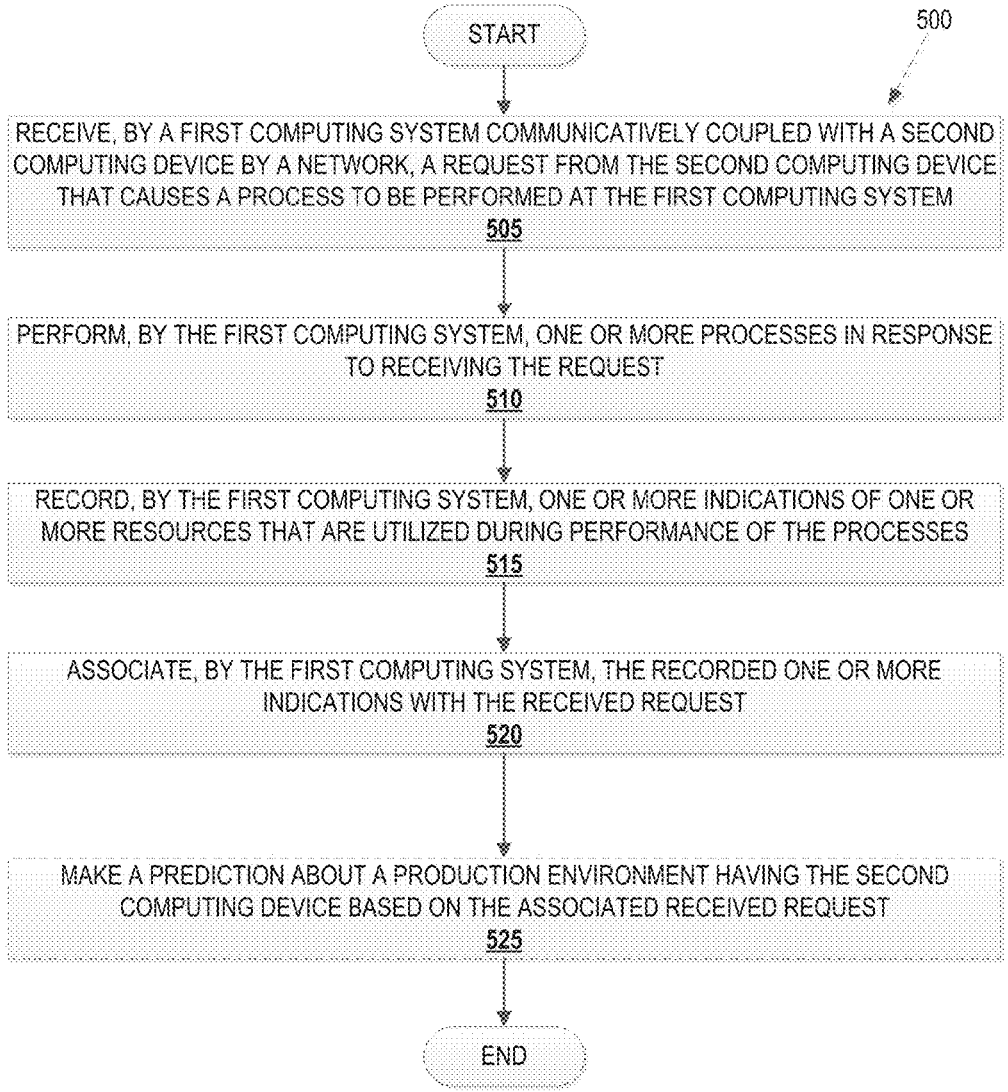
FIG. 5 is a flow diagram depicting a method for gathering usage of computing resources for testing processes of a production environment, according to various embodiments.

Turning to FIG. 5, a method 500 is shown for gathering usage of computing resources for testing processes of a production environment, according to one embodiment. The method 500 may be performed by in the system 100 by, for example, the server 150. While FIG. 5 illustrates a plurality of sequential operations, one of ordinary skill would understand that one or more operations of the method 500 may be transposed and/or performed contemporaneously.

The method 500 may begin with an operation 505 of receiving a request from a second computing device that causes a process to be performed at a first computing system. The first computing system and the second computing device are communicatively coupled via a network, over which the request may be transmitted. In response to receiving the request from the second computing device, the first computing system is configured with the operation 510 of performing one or more processes. The first computing system may be adapted to perform the one or more processes so that the first computing system may respond to the second computing device's request, which may be a request for a network or hosted service provided by the first computing system.

During performance of the one or more processes, at least one resource of the first computing system may be consumed. Accordingly, the method 500 includes an operation 515 for recording one or more indications of one or more resources that are utilized during performance of the processes. In some embodiments, a resource comprises a tangible medium, such as a processor, a memory, a network, or a storage device. In another embodiment, a resource comprises an instruction that correspond to the source code underlying a service that invoked the processes—i.e., as each instruction is performed, that instruction (and the corresponding code) is consumed. The resource may also be time, such as an interval during which the process is executing. When and/or how such resources are utilized during the execution of the process may be recorded, such as in a log file.

In connection with recording an indication of the resource that is consumed, the operation 520 includes associating the recorded one or more indications with the received request. The received request may be associated with the one or more indications by, for example, appending an indication of the received request (e.g., data from the received request) to one or more records for the one or more indications of the utilized resources. With this operation 520, a testing computing device may discern a request (or the content of a request) that prompted utilization of the one or more computing resources. In various embodiments, only content of the request that is germane to the utilization of the resource may be associated.

In one embodiment, the recorded one or more indications and the associated received request may be used in a testing environment to improve services provided in a production environment to the second computing device. Therefore, the operation 525 may be included for making a prediction about the production environment based on the associated received request. This operation 525 may be omitted or may be performed by a computing device that is separate from the first computing system.

In various embodiments, a predication may be directed to capacity planning in a production environment. For example, a plurality of records, including the recorded one or more indications and the associated received request, may be examined to determine temporal trends of received requests so hardware requirements in the production environment may be predicted—e.g., operation 525 may include predicting whether additional memory or processor capacity is necessary in the production environment to satisfy requests of the second computing device (and other similar computing devices configured to transmit requests in the production environment).

Similarly, releases of software applications (e.g., a service for which the second computing device issues the request) that cause processes of the first computing system to execute may be compared to predict which releases are adapted to better handle requests in the production environment. In some embodiments in which the resource includes code comprising a service that caused the process to be performed, one or more frequently exercised sections of code may be predicted to require more thorough testing (e.g., based on a plurality of records). For example, a first section of the source code may be determined to be exercised more than a second section of the source code based on a plurality of executions of the one or more processes, and thus the first section may be predicted to require additional testing beyond the second section.

Figure 6:
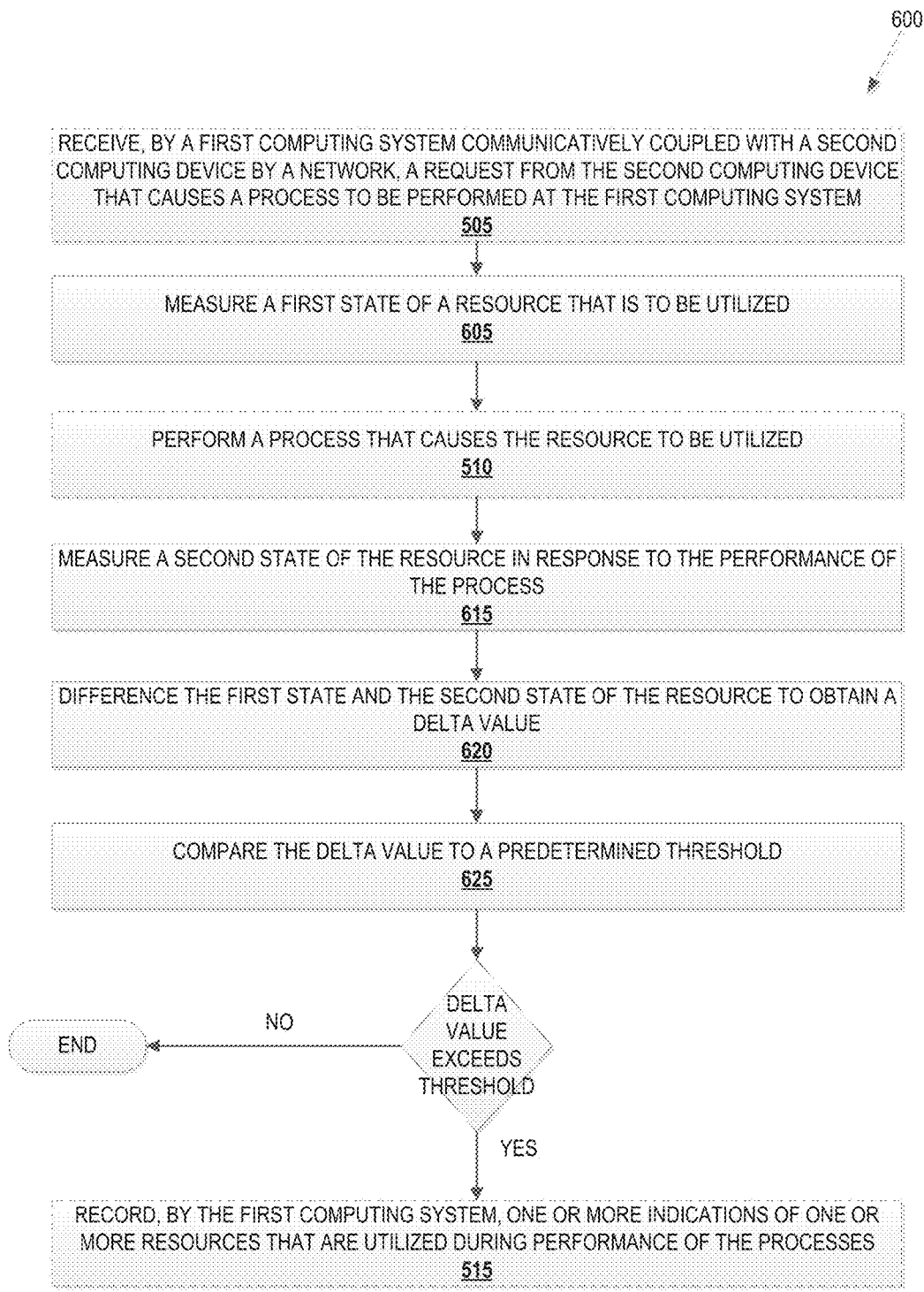
FIG. 6 is a flow diagram depicting a method for measuring the change between two states of a computing resource as the result of utilization in a production environment, according to various embodiments.

Now with respect to FIG. 6, a method 600 is shown for measuring the change between two states of a computing resource as the result of real-time utilization, according to one embodiment. The method 600 may be performed in the system 100 by, for example, the server 150. In some embodiments, the method 600 may be performed in connection with the method 500 of FIG. 5—for example, the operations of the method 600 may be included with operations 510 and 515 so that one or more indications are recorded at operation 515 only where the observed utilization of a resource reaches a predetermined threshold. While FIG. 6 illustrates a plurality of sequential operations, one of ordinary skill would understand that one or more operations of the method 600 may be transposed and/or performed contemporaneously.

In various embodiments, the initiation of the method 600 may be preceded by at least one operation of receiving a request that is to cause a process to be performed. The method 600 may begin with an operation 605 of measuring a first state of a resource that is to be utilized. In one embodiment, a service comprising code (that is to be translated to machine-executable instructions) invokes the process and this code may be instrumented. Due to the instrumented build, states of one or more resources may be measured at predetermined points in the traversal through the code; the first state of the resource may be measured before or early into the execution of the process invoked by the service.

Proceeding to next operation 510, the operation 510 includes performing the process that is to cause the resource to be utilized. This operation 510 is described in greater detail with respect to FIG. 5. The performance of the process will cause at least one resource to be consumed and, therefore, operation 615 includes measuring a second state of the first-measured resource. The operation 615 may be performed after the process is performed at operation 510 or, alternatively, while the process is still being performed at operation 510. In some embodiments, a service comprising instrumented code (that is to be translated to machine-executable instructions) invokes the process and the second state of the resource may be measured based on an instrumentation marker or instruction in the code.

From the two measured values of the resource, the method 600 includes an operation 620 that comprises differencing the first measured state and the second measured state of the resource to obtain a delta value. Accordingly, operation 625 comprises comparing this delta value to a predetermined threshold, such as a threshold that is to indicate the performed process is appreciably expensive in utilization of the resource. If the delta value exceeds this threshold, the method 600 may proceed to operation 515 for recording an indication of the resource that is utilized during performance of the process (as described in the description related to FIG. 5).

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments are not described with reference to any particular programming language. It will be appreciated that a variety of programming languages may be used to implement the teachings of embodiments as described herein.

In the foregoing Specification, embodiments have been described with reference to specific exemplary embodiments thereof. It will be evident that various modifications may be made thereto without departing from the broader spirit and scope of the embodiments described herein as set forth in the following claims. The Specification and drawings are, accordingly, to be regarded in an illustrative sense rather than a restrictive sense.

What is claimed is:

1. A computer-implemented method comprising:
   providing, by a server computing system, access to a production service in a production environment to a client computing device over a network;
   receiving, by the server computing system over the network, at least one production input from the client computing device;
   executing, by the server computing system, the production service using the at least one production input received from the client computing device;
   consuming, by the server computing system, a first resource based on the executing of the production service;
   identifying, by the server computing system, a first effect on the first resource resulting from the consuming of the first resource by the executing of the production service;
   storing, by the server computing system, a testing input matching the production input received from the client computing device in response to the identifying of the first effect resulting from the consuming of the first resource; and
   executing, on a testing computing device in a testing environment, a testing service that matches the production service using the testing input to cause a consumption of the first resource.

2. The computer-implemented method of claim 1, wherein the testing service is used for at least one of regression testing or code coverage analysis.

3. The computer-implemented method of claim 1, wherein the first resource comprises at least one of an instruction executed for performance of the production service, a processor, a memory, a network transaction, a disk, or a duration to execute at least a part of the production service.

4. The computer-implemented method of claim 1, wherein identifying the first effect on the first resource resulting from the consuming of the first resource comprises at least one of identifying that a measured consumption of the first resource exceeds a predetermined threshold, identifying an instruction that is executed for the production service, identifying a duration to perform at least a part of the production service, identifying a percentage of a processor capacity that is utilized, or identifying an amount of memory that is used.

5. A computer-implemented method comprising:
   receiving, by a first computing system of a production environment that is communicatively coupled with a second computing device by a network, a request from the second computing device to cause a process to be performed using a production input at the first computing system;
   performing, by the first computing system, the process in the production environment in response to receiving the request;
   recording, by the first computing system, an indication of a first resource utilized during the performing of the process;
   storing a testing input matching the production input in response to the recording of the indication;
   associating, by the first computing system, the indication with the received request; and
   providing, by the first computing system, the indication and the testing input to a testing computing device, the testing computing device to execute a test using the testing input.

6. The computer-implemented method of claim 5, wherein the resource comprises one of a processor, a memory, a network transaction, a disk, or an execution duration associated with the performing of the process.

7. The computer-implemented method of claim 5, wherein the recording of the indication comprises:
   recording the indication in response to an observed utilization of the first resource reaching a predetermined threshold.

8. The computer-implemented method of claim 5, wherein the first resource is an instruction to be executed by a processor of the first computing system for the performance of the process, the instruction to correspond to at least one predetermined line of source code, and further wherein the recording of the indication comprises recording the indication in response to execution of the at least one instruction that corresponds to the predetermined line of the source code.

9. The computer-implemented method of claim 5, further comprising:
   separating, by the first computing system, a first indication into a first group and a second indication into a second group according to one or more resources that are utilized during the performance of the process, for the subsequent testing of the process according to the one or more resources that are utilized.

10. A system comprising:
    a processing device; and
    a memory to store computer-executable instructions, that, if executed, cause the processing device to:
       receive, by the processing device communicatively coupled with a computing device by a network, a request from the computing device to cause a process to be performed by the processing device in a production environment using a production input;

perform the process in the production environment in response to the request;

record an indication of a first resource utilized during the performing of the process;

store a testing input matching the production input;

associate the indication with the request; and provide the indication and the testing input to a testing computing device, the testing computing device to execute a test using the testing input.

11. The computer system of claim 10, wherein the resource comprises one of a processor, a memory, a network transaction, a disk, or an execution duration associated with performing of the process.

12. The computer system of claim 10, the processing device to determine the resource is utilized at or above a threshold.

13. The computer system of claim 10, wherein the test comprises at least one of a regression test or code coverage analysis.

14. The computer system of claim 10, wherein the indication results from at least one of identifying an instruction that is executed in the production environment, identifying a duration to perform at least a part of the process, identifying a percentage of a capacity of the processing device that is utilized, or identifying an amount of memory that is utilized.

15. A non-transitory computer-readable storage device storing computer-executable instructions that, if executed by a processing device, cause the processing device to:

receive, by the processing device communicatively coupled with a computing device by a network, a request from the computing device to cause a process to be performed by the processing device in a production environment using a production input;

perform the process in the production environment in response to the request;

record an indication of a first resource utilized during the performing of the process;

store a testing input matching the production input;

associate the indication with the request; and provide the indication and the testing input to a testing computing device, the testing computing device to execute a test using the testing input.

16. The non-transitory computer-readable storage device of claim 15, wherein the resource comprises one of a processor, a memory, a network transaction, a disk, or a duration associated with performing of the process.

17. The non-transitory computer-readable storage device of claim 15, the processing device to determine the resource is utilized at or above a threshold.

18. The non-transitory computer-readable storage device of claim 15, wherein the test comprises at least one of a regression test or code coverage analysis.

19. The non-transitory computer-readable storage device of claim 15, wherein the indication results from at least one of identifying an instruction that is executed in the production environment, identifying a duration to perform at least a part of the process, identifying a percentage of a capacity of the processing device that is utilized, or identifying an amount of memory that is utilized.

* * * * *